(12) United States Patent
Thomassey

(10) Patent No.: US 10,526,065 B2
(45) Date of Patent: Jan. 7, 2020

(54) DRONE HAVING AT LEAST THREE LIFT AND PROPULSION ROTORS

(71) Applicant: AIRBUS HELICOPTERS, Marignane (FR)

(72) Inventor: Lionel Thomassey, Fos sur Mer (FR)

(73) Assignee: AIRBUS HELICOPTERS, Marignane (FR)

( * ) Notice: Subject to any disclaimer, the term of this patent is extended or adjusted under 35 U.S.C. 154(b) by 360 days.

(21) Appl. No.: 15/497,387

(22) Filed: Apr. 26, 2017

(65) Prior Publication Data

US 2017/0305526 A1 Oct. 26, 2017

(30) Foreign Application Priority Data

Apr. 26, 2016 (FR) ...................................... 16 00688

(51) Int. Cl.
*B64C 27/22* (2006.01)
*B64C 27/26* (2006.01)
(Continued)

(52) U.S. Cl.
CPC ............... *B64C 3/56* (2013.01); *B64C 25/32* (2013.01); *B64C 27/22* (2013.01); *B64C 27/26* (2013.01);
(Continued)

(58) Field of Classification Search
CPC .... B64C 3/38; B64C 3/42; B64C 3/56; B64C 27/22; B64C 27/26; B64C 25/32;
(Continued)

(56) References Cited

U.S. PATENT DOCUMENTS 2,511,362 A 6/1950 Mercier
2,580,312 A * 12/1951 Moore .................... B64C 27/26
244/7 C (Continued)

FOREIGN PATENT DOCUMENTS

CN 105129081 12/2015
GB 743856 1/1956
(Continued)

OTHER PUBLICATIONS

French Search Report for French Application No. FR 1600688, Completed by the French Patent Office, dated Jan. 11, 2017, 7 Pages.

*Primary Examiner* — James S Bergin
(74) *Attorney, Agent, or Firm* — Brooks Kushman P.C.

(57) ABSTRACT

A drone comprising a carrier structure, at least three lift propulsion rotors and a control system delivering at least one electrical power supply to at least three electric motors driving said at least three rotors, said at least three rotors being spaced apart longitudinally and transversely beside one another, wherein said drone includes a wing carrying two half-wings symmetrically about an anteroposterior plane of symmetry P of said drone, serving at least to increase the lift of said drone, each of said two half-wings including at least one movable portion suitable for moving relative to said carrier structure of said drone with at least a first degree of freedom to move in rotation about a first pivot axis parallel to a longitudinal direction X of said drone; and two first electric actuators respectively enabling each of said movable portions of one of said two half-wings.

12 Claims, 4 Drawing Sheets

(51) Int. Cl.
  *B64C 3/56* (2006.01)
  *B64C 29/00* (2006.01)
  *B64C 25/32* (2006.01)
  *B64C 39/02* (2006.01)
(52) U.S. Cl.
  CPC ........ *B64C 39/024* (2013.01); *B64C 29/0025* (2013.01); *B64C 2025/325* (2013.01); *B64C 2201/102* (2013.01); *B64C 2201/108* (2013.01)
(58) Field of Classification Search
  CPC .......... B64C 2025/325; B64C 29/0025; B64C 2201/024; B64C 2201/027; B64C 2201/102
  USPC ........................................ 244/6, 7 R, 7 A, 7 C
  See application file for complete search history.

(56) References Cited

U.S. PATENT DOCUMENTS

| | | | | |
|---|---|---|---|---|
| 2,881,989 | A * | 4/1959 | Flettner | B64C 27/26 244/6 |
| 3,149,800 | A * | 9/1964 | Sintes | B64C 3/42 244/7 R |
| 5,085,315 | A | 2/1992 | Sambell | |
| 5,758,844 | A * | 6/1998 | Cummings | B64C 29/0033 244/12.4 |
| 7,137,589 | B2 | 11/2006 | Arata | |
| 8,403,255 | B2 | 3/2013 | Piasecki | |
| 8,733,690 | B2 * | 5/2014 | Bevirt | B64C 29/0033 244/12.4 |
| 8,774,982 | B2 | 7/2014 | Oakley et al. | |
| 9,120,560 | B1 * | 9/2015 | Armer | B64C 29/0008 |
| 9,540,101 | B2 * | 1/2017 | Paduano | B64C 13/16 |
| 9,586,683 | B1 * | 3/2017 | Buchmueller | B64C 39/024 |
| 9,682,774 | B2 * | 6/2017 | Paduano | B64C 13/16 |
| 9,840,324 | B2 * | 12/2017 | Shiosaki | B64C 11/46 |
| 9,868,524 | B2 * | 1/2018 | Welsh | B64C 39/024 |
| 10,081,424 | B2 * | 9/2018 | Radu | B64C 37/00 |
| 10,287,011 | B2 * | 5/2019 | Wolff | B64C 29/0033 |
| 2013/0206921 | A1 | 8/2013 | Paduano et al. | |
| 2017/0057630 | A1 | 3/2017 | Schwaiger | |
| 2019/0152593 | A1 * | 5/2019 | Castellano Aldave | B64C 27/28 |

FOREIGN PATENT DOCUMENTS

| | | | |
|---|---|---|---|
| WO | 2015124556 | 8/2015 | |
| WO | 2016003530 A2 | 1/2016 | |
| WO | 2016003530 A3 | 1/2016 | |
| WO | WO-2019085148 A1 * | 5/2019 | ............ B64C 3/56 |

* cited by examiner

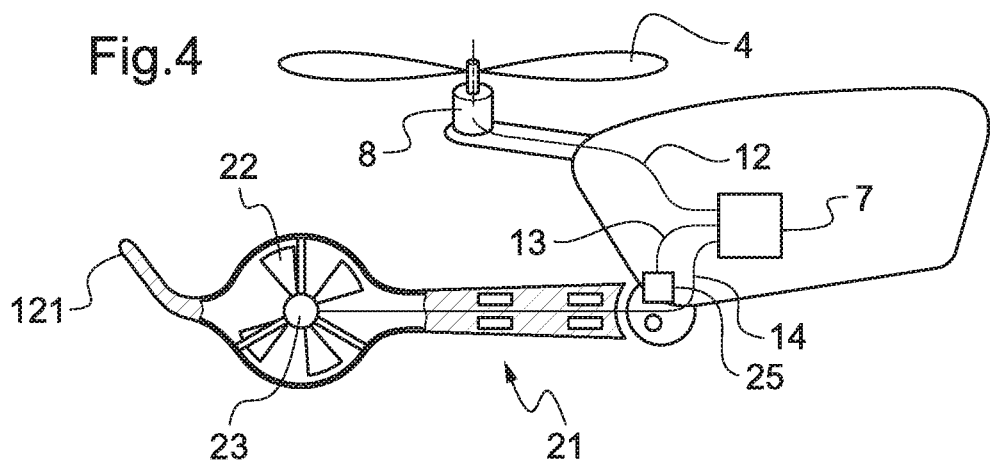
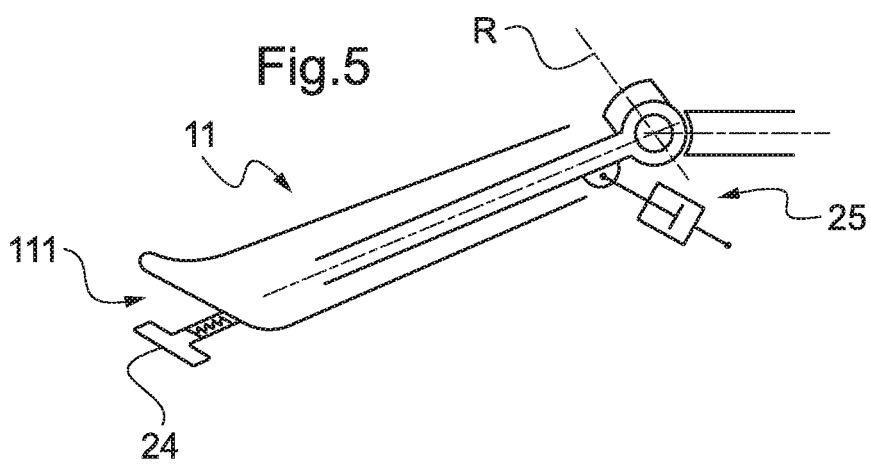
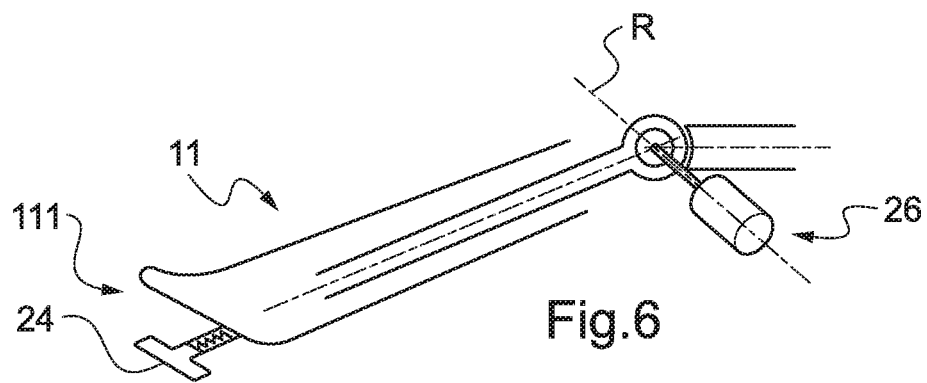

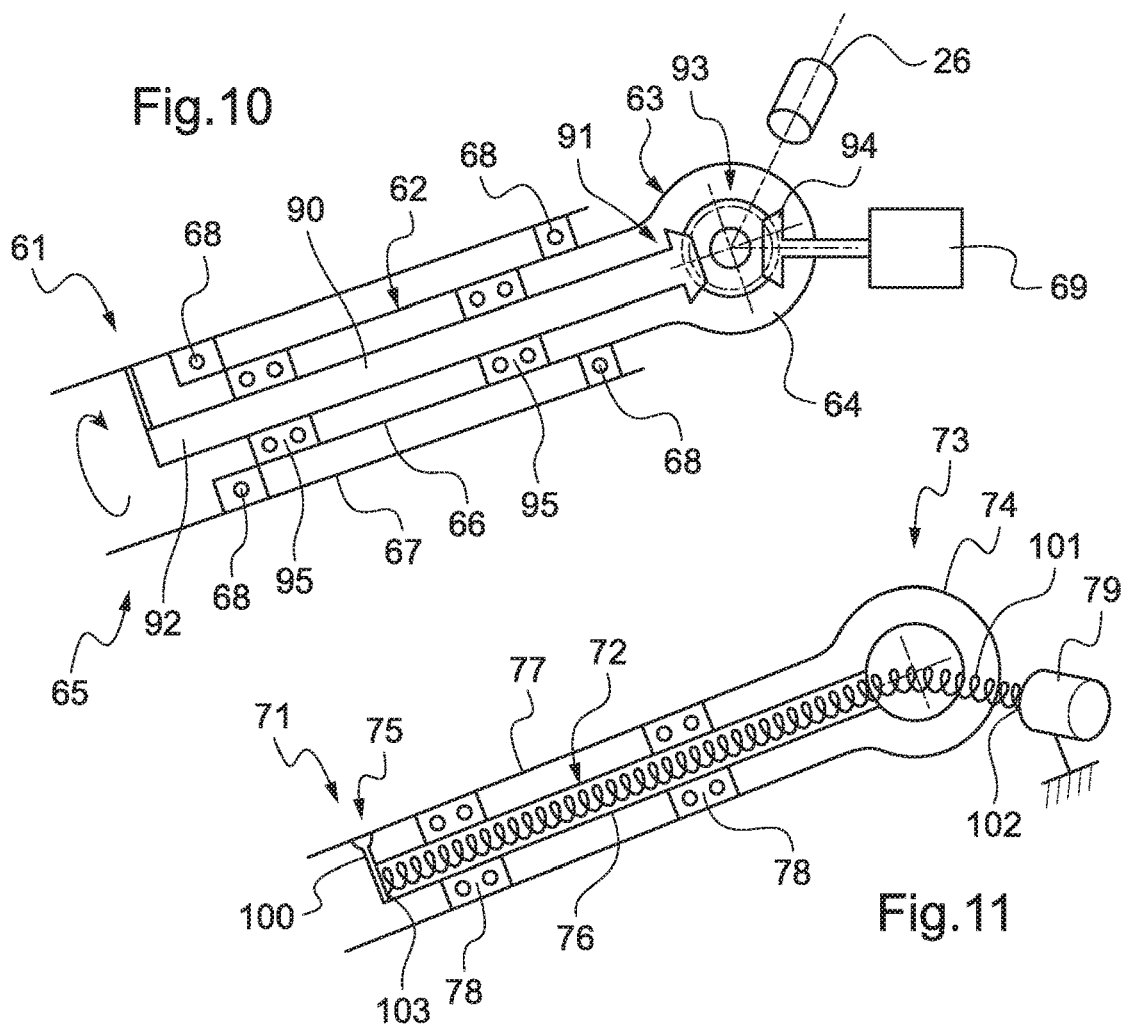
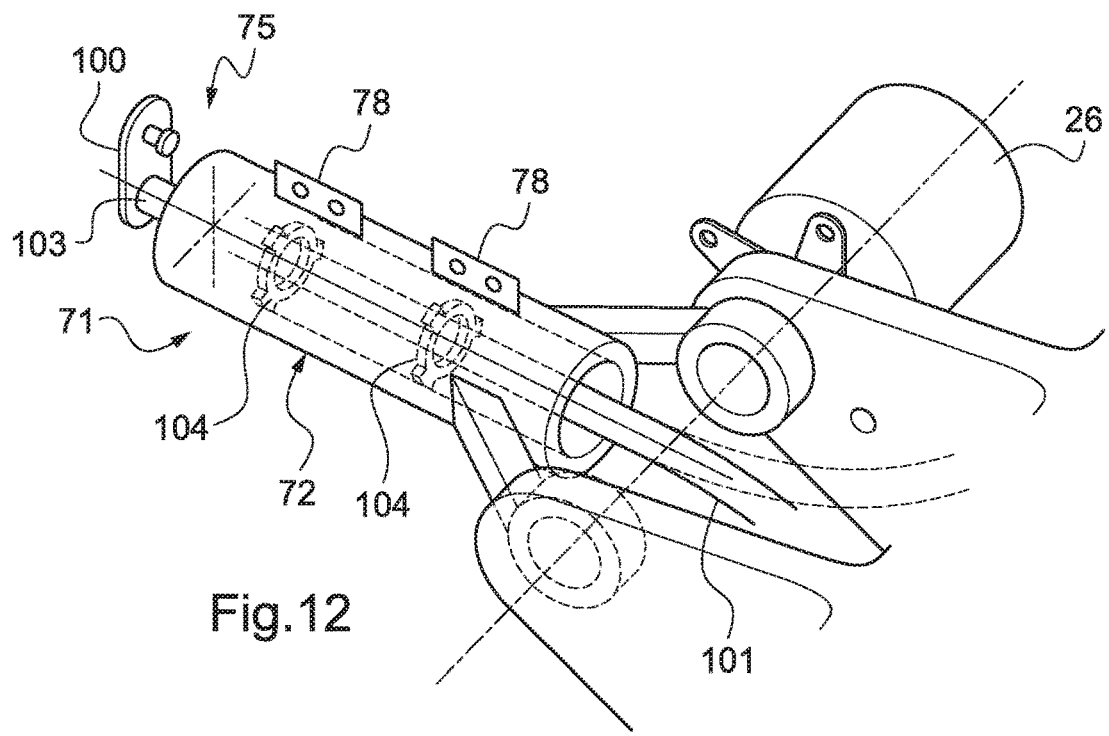

DRONE HAVING AT LEAST THREE LIFT AND PROPULSION ROTORS

CROSS-REFERENCE TO RELATED APPLICATIONS

This application claims priority to French patent application No. FR 16 00688 filed on Apr. 26, 2016, the disclosure of which is incorporated in its entirety by reference herein.

BACKGROUND OF THE INVENTION

(1) Field of the Invention

The present invention relates to the field of aircraft having no pilot or crew on board. Such aircraft are commonly referred to as "drones" or else as unmanned aerial vehicles (UAVs).

More particularly, the invention relates to a drone having at least three lift and propulsion rotors driven in rotation by at least three independent electric motors and controlled by a centralized control system.

(2) Description of Related Art

In addition, such drones may either be autonomous, i.e. having automatic navigation and piloting means, or else they may be remotely controlled, i.e. having at least means for receiving control signals using a wireless communication protocol, e.g. by radio. Such control signals then enable the control system of the at least three rotors equipping that type of drone to be remotely controlled.

Thus, in order to propel such drones and provide them with lift, each of them has a lift assembly formed by those at least three rotors. Although such a lift assembly enables stages of hovering flight to be performed, it nevertheless consumes a large amount of electrical energy, not only during stages of hovering flight, but also during stages of cruising flight when a drone is traveling to reach a far-off location.

Such drones having at least three lift and propulsion rotors therefore do not possess long range or considerable endurance and/or cannot perform missions over long distances.

Thus, Document WO 2015/124556 A1 describes a drone having four rotors that are juxtaposed with one another and secured to a carrier structure. Such a drone also has two half-wings, each including a portion that is movable relative to the carrier structure. In addition, such movable portions are suitable for folding between a deployed position and a folded position.

Nevertheless, in that drone, the pivot axis enabling the two movable portions to pivot relative to the carrier structure is oriented in a direction perpendicular to the plane defined by the carrier structure of the drone. Consequently, when the movable portions of the half-wings are arranged in the folded position, they lie against the plane defined by the carrier structure. Such a pivot axis is therefore not arranged parallel to a longitudinal direction of the carrier structure, and each half-wing can come into contact with the ground via its longitudinal edge section comprising a trailing edge and/or a leading edge of the airfoil formed by the two half-wings.

Such an arrangement is therefore not suitable for enabling the two half-wings to form landing gear of the drone. Specifically repeated contact between the ground and the edges of the wings can then damage and degrade the flying performance of such a drone having two half-wings. Furthermore, the shape of the carrier structure of the drone described in Document WO 2015/124556 A1 is substantially square. Such a drone therefore does not have a shape that is elongate in a longitudinal direction X with half-wings suitable for folding about axes parallel to the longitudinal direction X.

Document US 2013/0206921 A1 describes a drone having two engines each having two contrarotating rotors positioned symmetrically on either side of a midplane. Such a drone also has two half-wings suitable for folding so as to form a support for the drone enabling the engines to be oriented at an angle of inclination that is sufficient to deliver thrust that is vertical in part so as to enable the drone to take off vertically.

Nevertheless, in that drone, although each of the half-wings does indeed have a movable portion, the pivot axis of the revolute joint is not oriented parallel to the longitudinal direction of the drone. Specifically, the pivot axis slopes forwards and towards the ground when the longitudinal direction of the drone is horizontally oriented. Such an arrangement thus enables the drone to stand on its tail with an angle $\delta_T$ that is much less than 90°.

Document WO 2016/003530 A2 describes a vertical takeoff/landing drone having foldable wings. Such a drone nevertheless has only one central rotor with its axis of rotation parallel to the longitudinal direction of the drone. Like the drone described in Document WO 2015/124556 A1, it is the trailing edge of the airfoil of each half-wing that comes into contact with the ground, and under no circumstances can it be used as landing gear.

Document CN 105 129 081 A describes a drone having four juxtaposed rotors with two non-foldable half-wings.

BRIEF SUMMARY OF THE INVENTION

An object of the present invention is to propose a drone having at least three lift and propulsion rotors and that enables the above-mentioned limitations to be overcome. Such a drone in accordance with the invention thus makes it possible to reach locations that are far away from a starting base, which may be several tens of kilometers or indeed several hundreds of kilometers away, and, where appropriate, also makes it possible to return to the starting base. This increase in range is obtained in particular by reducing the consumption of electrical energy of the at least three rotors while the drone is performing a stage of forward flight.

The invention thus provides a drone comprising a carrier structure, at least three lift and propulsion rotors and a control system delivering at least one electrical power supply to at least three electric motors driving the at least three rotors respectively in rotation about axes of rotation arranged substantially vertically and serving to generate vertical thrust. The at least three rotors are spaced apart longitudinally and transversely beside one another.

The drone is remarkable firstly in that it includes:

a wing carrying two half-wings symmetrically about an anteroposterior plane of symmetry P of the drone, serving at least to increase the lift of the drone, each of the two half-wings including at least one movable portion suitable for moving relative to the carrier structure of the drone with at least a first degree of freedom to move in rotation about a first pivot axis R parallel to a longitudinal direction X of the drone, each movable portion being adapted to move between a folded position in which a free end of each movable portion forms landing gear of the drone, and a deployed position in which each movable portion increases the lift of the drone; and two first electric actuators respectively enabling each of the movable portions of each of the two half-wings to be moved; and secondly, the control system delivers at least one electrical power supply to the first electric actuators in order to enable each of them to move the corresponding movable portion of the two half-wings between the folded position and the deployed position, and/or vice versa between the deployed position and the folded position.

In other words, the movable portions of the two half-wings of the drone are arranged via a revolute type joint relative to the carrier structure. These movable portions of the half-wings can then serve both as landing gear via their free ends and as fixed wings for temporarily increasing the lift of the drone in flight. In this way, when the half-wings are deployed, there is a reduction in the electrical energy consumption of the electric motors driving rotation of the at least three lift and propulsion rotors. These two half-wings are also naturally arranged symmetrically on either side of the carrier structure of the drone, with their respective spans extending substantially perpendicularly relative to the longitudinal direction X of the drone.

The axes of rotation of the at least three electric motors are also arranged perpendicularly relative to the longitudinal direction X, thus making it possible to generate vertical thrust while the carrier structure remains substantially horizontal.

The two first electric actuators thus enable the movable portion of each half-wing to move at least in a first pivot direction between the folded position and the deployed position, or vice versa between the deployed position and the folded position. The return to the initial position corresponding to the folded position or to the deployed position may be achieved either likewise by the two first electric actuators operating in a second direction opposite to the first direction of rotation, or else by resilient return means such as at least one spring that may be loaded in traction, in compression, or in twisting.

In addition, the control system on board the drone serves to control simultaneously the electrical power supply to the at least three electric motors respectively driving rotation of the at least three rotors and the two first electric actuators for moving the movable portions of the two half-wings.

In a first variant, by way of example, the first electric actuators may be formed by jacks delivering linear movement between a point of each movable portion and a point of the carrier structure of the drone. These two points are also offset from the first pivot axis R so as to enable each movable portion to move in rotation relative to the carrier structure of the drone.

In a second variant, by way of example, the first electric actuators may be formed by gear motors including encoders capable in particular of determining an angular position for the rotation of the movable portion relative to the carrier structure of the drone. This type of first actuator in the second variant is then advantageously arranged at the first pivot axis R.

Advantageously, each of the movable portions may be suitable for moving relative to the carrier structure of the drone with a second degree of freedom to move in rotation about a second pivot axis R' substantially parallel to a transverse direction Y of the drone when the movable portions of the two half-wings are arranged in the deployed position.

In other words, the movable portion of each half-wing can pivot about two pivot axes R and R' that may be perpendicular to each other, for example. Each movable portion is thus arranged via a cardan or universal type joint relative to the carrier structure of the drone.

Furthermore, each movable portion is suitable for pivoting independently relative to the other about the second pivot axis R'. Consequently, the angle of rotation corresponding to the angular position of a left movable portion of the left half-wing of the drone relative to the carrier structure may be different from the angle of rotation corresponding to the angular position of the right movable portion of the right half-wing of the drone relative to the carrier structure.

Thus, when the angle of rotation corresponding to the angular position of a movable portion of a left half-wing relative to the carrier structure is modified in a direction opposite from the angle of rotation corresponding to the angular position of a movable portion of a right half-wing relative to the carrier structure, the control system enables the drone to be controlled in roll.

In contrast, when the angle of rotation corresponding to the angular position of the movable portion of a left half-wing relative to the carrier structure is modified simultaneously while remaining equal to the angle of rotation corresponding to the angular position of a movable portion of a right half-wing relative to the carrier structure, then the control system can control pitching of the drone, and possibly lead to changes of altitude.

In practice, each of the movable portions may comprise:
a spar having a proximal end at which there are arranged at least two first bearings to form a revolute type joint about the first pivot axis R with the carrier structure of the drone, and a distal end opposite from the proximal end;
at least one airfoil element covering the spar; and
at least two second bearings for forming a revolute type joint about the second pivot axis R' between the spar and the airfoil element.

In this way, the at least two first bearings serve to implement the first degree of freedom to move in rotation about the first pivot axis R between the spar and the carrier structure of the drone.

Likewise, the at least two second bearings serve to provide the second degree of freedom to move in rotation about the second pivot axis R' between the spar and the airfoil element. These at least two second bearings are advantageously spaced apart from each other in order to limit the extent to which the airfoil element is cantilevered out from the two first bearings. One of said second bearings is then arranged in the proximity of the proximal end of the spar, while the other of said second bearings is arranged in the proximity of the distal end of the spar. In addition, the second pivot axis R' is arranged substantially along the span of the spar.

By way of example, these first and second bearings may be formed by ball bearings, by needle bearings, or by roller bearings, by so-called self-lubricating bronze smooth bearings, or indeed by smooth bearings made of polymer material having a low coefficient of friction, specifically such as polytetrafluoroethylene.

In addition, such an airfoil element has an internal structure secured to the at least two second bearings and an outer covering with a suction side face and a pressure side face. The internal structure and the outer covering of the airfoil element may thus be made of two separate structures that are secured to each other by a rigid type joint or may constitute a single-piece part made of a single material.

Furthermore, the spar may be tubular in shape.

Thus, the spar is advantageously hollow along its entire length between its proximal end and its distal end. Such a hollow spar can then pass an electrical connection or any other transmission member enabling the airfoil element to be pivoted relative to the spar about the second pivot axis R', substantially coinciding with the span of the spar.

Specifically, in a first example, each of the movable portions may include a second electric actuator arranged at the distal end of the spar in order to control the angular orientation of the airfoil element relative to the spar about the second pivot axis R', and the control system may be suitable for delivering an electrical power supply to the two second electric actuators.

Under such circumstances, an electrical connection passes inside the tubular spar and enables electrical power to be supplied to each second electric actuator in order to control pivoting of each airfoil element relative to the corresponding spar.

Such a second actuator may be formed by a gear motor and may then, by way of example, drive rotation of a gearwheel secured to the motor-driven shaft of the gear motor, which gearwheel co-operates with at least one annular gear (within inside teeth) secured to the airfoil element in order to drive pivoting of the airfoil element relative to the spar. Alternatively, the gear motor could equally well drive rotation of a link secured firstly to the airfoil element and secondly to a drive shaft of the gear motor.

In a second example, the carrier structure may have two second electric actuators, each second electric actuator being arranged in the proximity of a proximal end of a respective spar for controlling the angular orientation of a respective airfoil element relative to the corresponding spar about the second pivot axis R'. The control system may be suitable for delivering an electrical power supply to the two second electric actuators.

Consequently, the two second electric actuators are not arranged in the movable portion of each half-wing, and the tubular shape of the spar serves to pass freely, and indeed to guide in rotation, a transmission member enabling the airfoil element to be driven in pivoting relative to the spar about the second pivot axis R'.

Consequently, in a first embodiment of the invention in compliance with the second example, each of the movable portions may include:

a transmission shaft guided to move in rotation inside the spar, the transmission shaft having a first end driven in pivoting by one of the two second electric actuators and a second end secured to the airfoil element to transmit pivoting motion from the transmission shaft to the airfoil element; and a transfer gearbox having three bevel gears for transmitting rotary motion generated by one of the at least two second electric actuators to the transmission shaft.

Under such circumstances, each transmission shaft is then guided in rotation, e.g. by means of ball bearings respectively with a bore of each tubular spar. Each transmission shaft is formed by a rigid shaft suitable for transmitting driving torque to drive the pivoting movement of each airfoil element.

Furthermore, each transfer gearbox is arranged at the level of the first pivot axis R of each half-wing and serves to transmit pivoting movement from one of the at least two secondary electric actuators to one of the transmission shafts regardless of the angular position of the spar about the first pivot axis R relative to the carrier structure.

In a second embodiment of the invention in accordance with the second example, the drone may include at least two flexible transmission members, each flexible transmission member including a first end driven in pivoting by one of the at least two second electric actuators and a second end secured with one of the airfoil elements to transmit pivoting movement from the flexible transmission member to the airfoil element.

In this other situation, the at least two flexible transmission members are likewise guided in rotation, e.g. by ball bearings respectively with a bore in each tubular spar. Such flexible transmission members may for example be formed by a flexible sheath containing a blade that is guided by two rows of balls that are free to rotate inside the sheath.

Such a second embodiment of the invention is thus advantageous compared with the first embodiment of the invention since it does not require any transfer gearbox, and is thus smaller in weight.

Furthermore, in practice, each of the movable portions may include an absorber system for absorbing at least part of the kinetic energy of the drone during landing.

By way of example, such an absorber system may comprise a hydraulic or pneumatic jack having a rod with a first end that comes into contact with the ground during landing of the drone and a cylinder that is secured to the movable portion of each half-wing. A second end of the rod then has a piston for moving fluid inside the cylinder, which fluid may pass through an orifice made in the piston.

In a particular embodiment of the invention, the at least three rotors may be formed at least by a left front rotor, a right front rotor, a left rear rotor, and a right rear rotor, where "left", "right", "front", and "rear" are relative to the longitudinal travel direction of the drone, the carrier structure having a shape that is elongate along the longitudinal direction X, the axes of rotation of the front rotors and the axes of rotation of the rear rotors being spaced at a longitudinal spacing L that is greater than a transverse spacing T between the axes of rotation of the left rotors and the axes of rotation of the right rotors. The wing may be connected to the carrier structure in a middle zone of the carrier structure in the longitudinal direction X.

Such an arrangement of the carrier structure then enables the half-wings to be positioned in the middle-zone of the drone in the longitudinal direction X.

Furthermore, the rotors may have the same diameter Ød, and the longitudinal spacing L between the axes of rotation of the front rotors and the axes of rotation of the rear rotors may be greater than the sum of the diameter Ød of the rotors plus a chord C of the half-wing measured in the proximity of a connection zone where the half-wing connects with the carrier structure.

In this way, the air stream generated by each of the rotors does not impact against the two half-wings when they are in the deployed position, and the chord of each half-wing may be relatively large in order to impart maximum lift.

Advantageously, each of the movable portions may also include at least one propulsion rotor driven in rotation by at least one electric propulsion motor, and the control system may be suitable for delivering an electrical power supply to the at least one electric propulsion motor.

In other words, the half-wings may include additional propulsion rotors serving in particular to enable the drone to reach a level travel speed that is greater than it could reach with no more than its at least three lift and propulsion rotors.

Furthermore, cruising flight at constant speed can be performed with the drone having a horizontal attitude rather than an inclined attitude as is needed when using only the at least three lift and propulsion rotors. The axes of the propulsion rotors are then oriented substantially parallel to the longitudinal direction X of the drone, whereas the axis of rotation of the at least three lift and propulsion rotors are oriented substantially along a direction in elevation Z that is perpendicular relative to the longitudinal direction X of the drone.

BRIEF DESCRIPTION OF THE DRAWINGS

The invention and its advantages appear in greater detail from the context of the following description of examples given by way of illustration and with reference to the accompanying figures, in which:

FIG. 4 is a fragmentary front view of a drone in accordance with the invention; and FIGS. 5 to 12 are fragmentary section views showing different variants of movable portions of drone half-wings in accordance with the invention.

Elements present in more than one of the figures may be given the same references in each of them.

DETAILED DESCRIPTION OF THE INVENTION

As mentioned above, the invention relates to a drone 1 having at least three propulsion and lift rotors.

Figure 1:
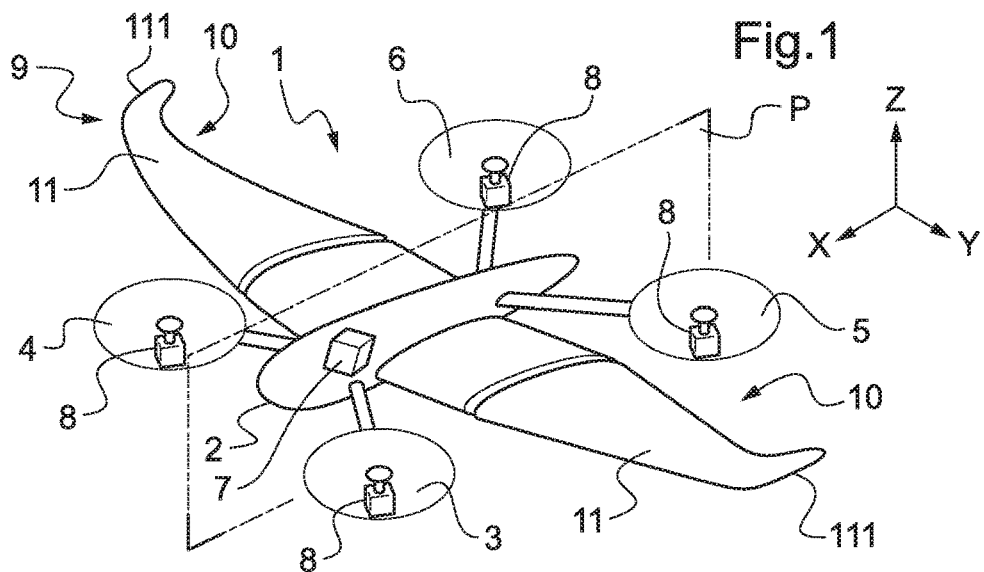
FIG. 1 is a perspective view of a drone in accordance with the invention.
Figure 2:
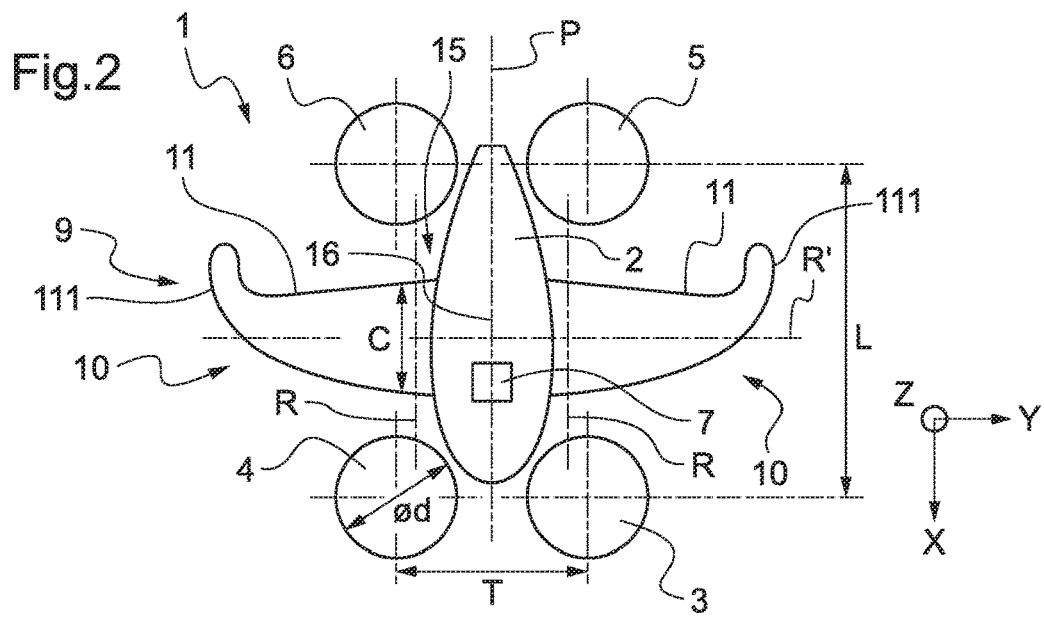
FIG. 2 is a plan view of a drone in accordance with the invention.
Figure 3:
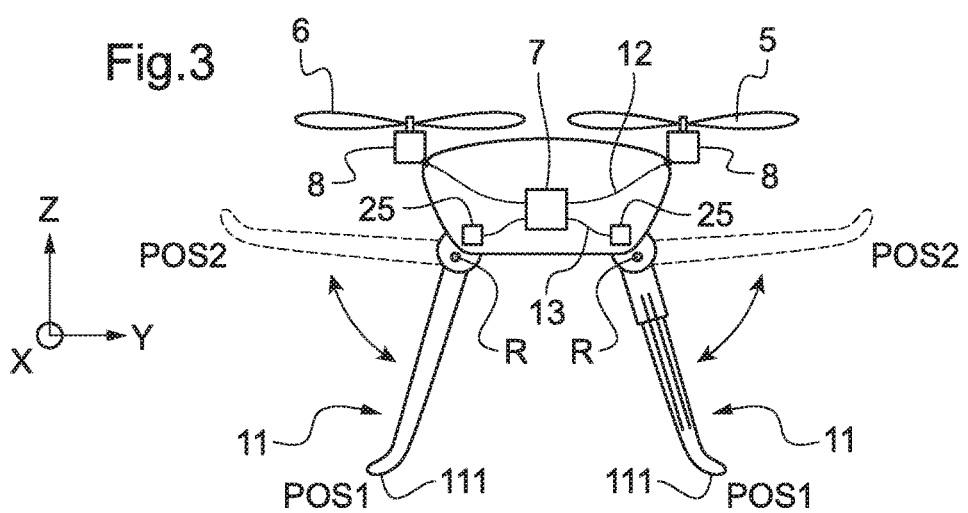
FIG. 3 is a first front view of a drone in accordance with the invention.

It should be observed that three mutually orthogonal directions X, Y, and Z are shown in FIGS. 1 to 3.

The direction X is said to be longitudinal insofar as it extends from rear to front of a carrier structure 2 of the drone 1 which is of elongate shape in this longitudinal direction X.

Another direction Y is said to be transverse insofar as it extends from the right zone to the left zone of the carrier structure 2 of the drone 1.

Finally, a third direction Z is said to be in elevation and corresponds to height dimensions of the drone 1.

By way of non-limiting example and for purposes of simplifying the detailed description of the invention, the drone 1 may comprise, as shown in FIG. 1, four rotors 3-6 arranged around the carrier structure 2. These four rotors are then constituted by a left front rotor 3, a right front rotor 4, a left rear rotor 5, and a right rear rotor 6. These rotors 3-6 are driven in rotation by electric motors 8 arranged on the same axes as the axes of rotation of the rotors 3-6.

In addition, each electric motor 8 is electrically powered by a control system 7 enabling the drone 1 to be remotely controlled or to be piloted automatically in autonomous manner in order to perform a predetermined mission.

Furthermore, such a drone 1 also has a wing 9 made up of two half-wings 10 that are symmetrical about an anteroposterior plane of symmetry P parallel to the plane defined by the axes X and Z. Each half-wing 10 has a movable portion 11 suitable for pivoting relative to the carrier structure 2. Such half-wings 10 then enable the lift of the drone 1 in flight to be increased, thereby limiting the consumption of electrical energy by the electric motors 8 in order to keep the drone 1 at a predetermined altitude.

Each of the movable portions 11 thus extends transversely between the carrier structure 2 and a respective free end 111 distinct from the end section of the half-wing 10.

As shown in FIG. 2, the carrier structure 2 of the drone 1 is of elongate shape in the longitudinal direction X. Thus, a longitudinal spacing L between the axes of rotation of the front rotors 3, 4 and the axes of rotation of the rear rotors 5, 6 may be greater than a transverse spacing T between the axes of rotation of the left rotors 3, 5, and the axes of rotation of the right rotors 4, 6.

In addition, such a carrier structure 2 has a middle zone 16 in the longitudinal direction X from which the two half-wings 10 emerge laterally in a direction that is substantially parallel to the transverse direction Y.

Furthermore, all four rotors 3-6 may advantageously have the same diameter (Dd.

Furthermore, the longitudinal spacing L is greater than the sum of the diameter Ød of a rotor 3 6 plus a chord C of the half-wings 10 measured in the proximity of a connection zone 15 connecting with the carrier structure 2.

In this way, the stream of air generated substantially vertically downwards by the four rotors 3-6 is not disturbed by the half-wings 10.

In the invention, the movable portion 11 of each half-wing 10 is thus free to pivot relative to the carrier structure 2 both about a first pivot axis R and also a second pivot axis R'.

The first pivot axis R is arranged substantially parallel to the longitudinal direction X of the drone 1, while the second pivot axis R' is arranged substantially parallel to the transverse direction Y of the drone 1.

As shown in FIG. 3, each movable portion 11 can thus pivot about a first pivot axis R between a folded position POS1 in which each free end 111 of a movable portion 11 acts as landing gear for the drone 1, and a deployed position POS2 in which each movable portion 11 increases the lift of the drone 1 in flight.

Furthermore, such an arrangement makes it possible to avoid any contact between the ground and the airfoils of the two half-wings 10, and in particular with their leading and/or trailing edges.

Each movable portion 11 is then pivoted about its first pivot axis R by means of a first electric actuator 25 electrically powered by the control system 7 via electrically-conductive wire connections 13. Likewise, the electric motors 8 of the rotors 3 6 are electrically powered by the control system 7 via electrically-conductive wire connections 12.

As shown in FIG. 4, each movable portion 21 may be equipped with a propulsion rotor 22 that is driven in rotation by an associated electric propulsion motor 23 and that is electrically powered by the control system 7 via electrically-conductive wire connections 14.

Such a propulsion rotor 22 may advantageously be of the electrically ducted fan (EDF) type corresponding to a ducted propeller or turbine driven by the electric propulsion motor 23.

These propulsion rotors 22 thus serve to increase the travel speed of the drone 1 in its longitudinal direction X while maintaining the speed of rotation of the rotors 3-6 at some minimum speed of rotation or even while interrupting the electrical power supply of the electric motors 8 of the rotors 3-6.

Furthermore, by applying differential thrust between the two propulsion rotors 22, it is possible to some extent to generate a yaw command for the drone 1.

In addition, each propulsion rotor 22 is arranged at the proximity of each of the free ends 121 of the two movable portions 21.

As shown in FIG. 5, in a first variant, the first electric actuator 25 may be formed by a jack having one of its ends secured to the carrier structure 2 and its other end secured to the movable portion 11 of the half-wing 10.

In any event, these ends of the jack are remote from the first pivot axis R in order to transform the movement in translation of the jack into movement in rotation of the movable portion 11 about the first pivot axis R.

As shown in FIG. 6, in a second variant, the first electric actuator 26 may be formed by a gear motor arranged on the first pivot axis R.

Figure 7:
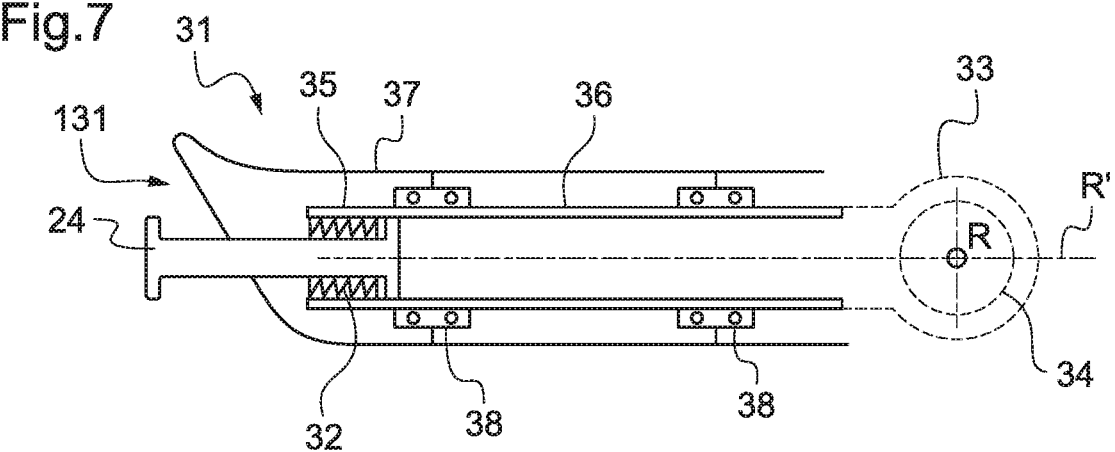

Furthermore, as shown in FIGS. 5 to 7, a first absorber system 24 may be fitted to the free end 111, 131 of the movable portion 11, 31 to absorb some or all of the kinetic energy of the drone 1 when landing on the ground or on the platform. Such an absorber system 24 thus has a member that is movable in translation and hydraulic or pneumatic means such as jacks.

As shown in FIG. 7, the movable portion 31 comprises a spar 36 having two first bearings 34 at a proximal end 33 of the spar 36. These two first bearings 34 then make it possible to establish the degree of freedom of the movable portion 31 to move in rotation relative to the carrier structure 2 about the first pivot axis R.

Such a spar 36 also has a distal end 35 remote from the proximal end 33. In addition, the spar 36 may be of tubular shape. Furthermore, the absorber system 24 in this example is shown as comprising a spring 32 co-operating with a bore formed inside the distal end 35 of the spar 36.

The movable portion 31 also has an airfoil element 37 that is guided to move in rotation about the second pivot axis R' so as to be capable of pivoting freely relative to the spar 36. The airfoil element 37 is guided to move in rotation by means of two second bearings 38, e.g. formed by ball bearings, needle bearings, or roller bearings.

Furthermore, the movable portion can be driven to move in rotation about the second pivot axis R' in various ways.

Figure 8:
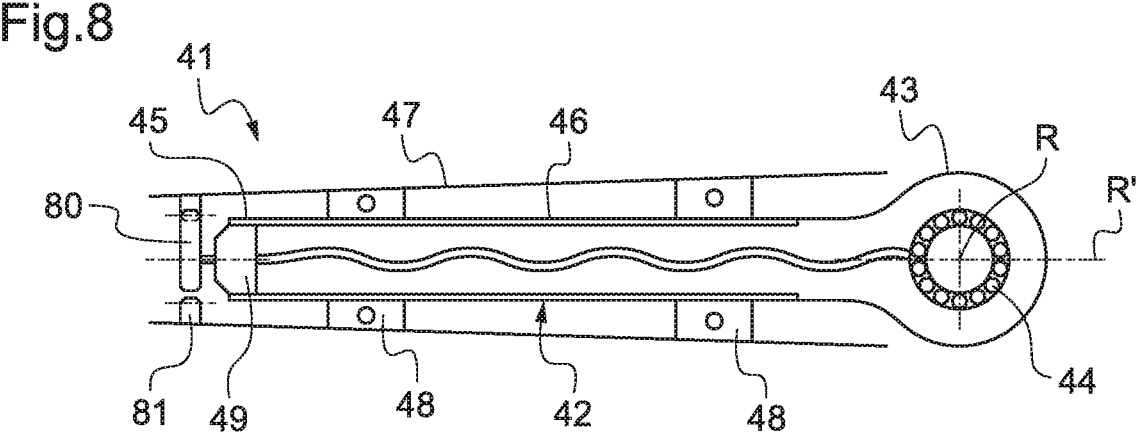
Figure 9:
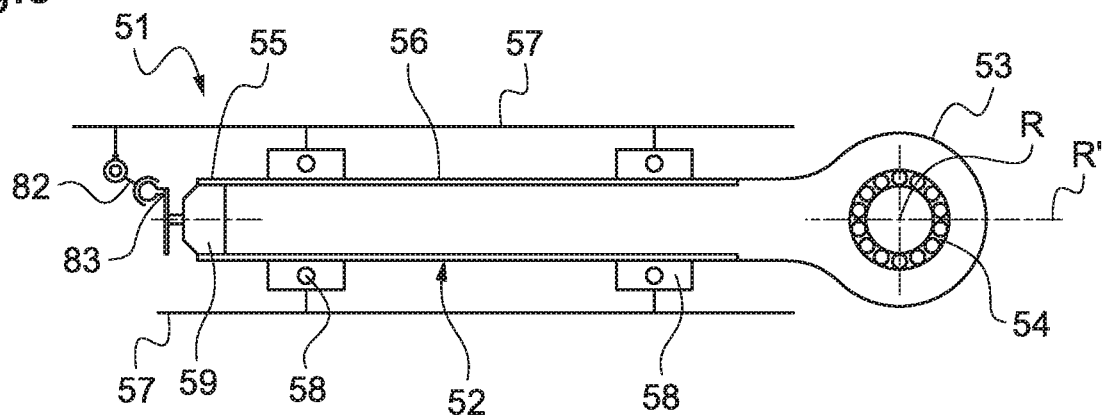

In a first example, as shown in FIGS. 8 and 9, each movable portion 41, 51 may comprise a respective second electric actuator 49, 59 for modifying the angular orientation of each airfoil portion 47, 57 relative to the respective spar 46, 56. Under such circumstances, the spar 46, 56 is thus of tubular shape and makes it possible to convey an electrical connection between the proximal end 43, 53 and the distal end 45, 55 of the spar 46, 56.

As above, the two first bearings 44, 54 serve respectively to guide movements in rotation of the spar 46, 56 about the first pivot axis R relative to the carrier structure 2. Likewise, two second bearings 48, 58 serve respectively to guide movements in rotation of the airfoil element 47, 57 about the second pivot axis R' relative to the spar 46, 56.

In FIG. 8, the second electric actuator 49 can drive rotation of a gearwheel 80 co-operating with an annular gear 81 (i.e. having inside teeth) secured to the airfoil element 47.

In an alternative as shown in FIG. 9, the second electric actuator 59 may equally well drive rotation of a motor-driven pin 83 that co-operates with one end of a link 82, with the other end of the link 82 co-operating with the airfoil element 57.

Furthermore, in a second example as shown in FIGS. 10 to 12, the second electric actuators 69, 79 may equally well be arranged respectively at the carrier structure 2 in the proximity of the proximal ends 63, 73 respectively of each of the spars 66, 76.

As above, two first bearings 64, 74 serve to guide movements in rotation of the respective spar 66, 76 about the first pivot axis R relative to the carrier structure 2. Likewise, two second bearings 68, 78 serve to guide movements in rotation of the airfoil element 67, 77 about the second pivot axis R' relative to the respective spar 66, 76.

Nevertheless, under such circumstances, the movable portion 61, 71 is no longer provided with a second actuator at the distal end 65, 75 of a spar 66, 76. Such a spar 66, 76 is nevertheless likewise of tubular shape and serves to pass either a transmission shaft 90 or else a flexible transmission member 101.

Thus, in a first embodiment of the invention, as shown in FIG. 10, bearings 95 may be received inside the spar 66 and serve to guide pivoting movements relative to the spar 66 of a transmission shaft 90 in order to transmit pivoting movement to the airfoil element 67.

A first end 91 of the transmission shaft 90 co-operates with a transfer gearbox 93 having three bevel gears 94. A second end 92 of the transmission shaft 90 is secured to the airfoil element 67 and enables the second electric actuator 69 to drive pivoting of the airfoil element 67 about the second pivot axis R'.

In a second embodiment of the invention, as shown in FIGS. 11 and 12, guides 104 may equally well be received inside the spar 76, thus enabling the flexible transmission member 101 to be held in position in order to transmit pivoting movements to the airfoil element 77. Such a flexible transmission member 101 may be formed by way of example by a sheath containing a blade that is guided by two rows of balls.

A first end 102 of the sheath is then secured to the second electric actuator 79 and a second end 103 of the sheath is extended by a connection 100 co-operating with the airfoil element 77 of the movable portion 71.

Such a flexible transmission member 101 then enables pivoting movements to be transmitted from the second electric actuator 79 to the airfoil element 77 about the second pivot axis R', with this being possible regardless of the angular position of the spar 76 about the first pivot axis R.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A drone comprising a carrier structure, at least three lift and propulsion rotors and a control system delivering at least one electrical power supply to at least three electric motors driving the at least three rotors respectively in rotation about axes of rotation arranged substantially vertically and serving to generate vertical thrust, the at least three rotors being spaced apart longitudinally and transversely beside one another, wherein the drone includes:
    a wing carrying two half-wings symmetrically about an anteroposterior plane of symmetry P of the drone, serving at least to increase the lift of the drone, each of the two half-wings including at least one movable portion suitable for moving relative to the carrier structure of the drone with at least a first degree of freedom to move in rotation about a first pivot axis R parallel to a longitudinal direction X of the drone, each movable portion being adapted to move between a folded position in which a free end of each movable portion forms landing gear of the drone, and a deployed position in which each movable portion increases the lift of the drone;
    two first electric actuators respectively enabling each of the movable portions of each of the two half-wings to be moved; and
    wherein the control system delivers at least one electrical power supply to the first electric actuators in order to enable each of them to move the corresponding movable portion of the two half-wings between the folded position and the deployed position, and/or vice versa between the deployed position and the folded position.

2. A drone according to claim 1, wherein each of the movable portions is suitable for moving relative to the carrier structure of the drone with a second degree of freedom to move in rotation about a second pivot axis R' substantially parallel to a transverse direction Y of the drone when the movable portions of the two half-wings are arranged in the deployed position.

3. A drone according to claim 2, wherein each of the movable portions comprises:
a spar having a proximal end at which there are arranged at least two first bearings to form a revolute type joint about the first pivot axis R with the carrier structure of the drone, and a distal end opposite from the proximal end;
at least one airfoil element covering the spar; and
at least two second bearings for forming a revolute type joint about the second pivot axis R' between the spar and the airfoil element.

4. A drone according to claim 3, wherein the spar is tubular in shape.

5. A drone according to claim 4, wherein each of the movable portions includes a second electric actuator arranged at the distal end of the spar in order to control the angular orientation of the airfoil element relative to the spar about the second pivot axis R', and wherein the control system is suitable for delivering an electrical power supply to the two second electric actuators.

6. A drone according to claim 4, wherein the carrier structure has two second electric actuators, each second electric actuator being arranged in the proximity of a proximal end of a respective spar for controlling the angular orientation of a respective airfoil element relative to the corresponding spar about the second pivot axis R', and wherein the control system is suitable for delivering an electrical power supply to the two second electric actuators.

7. A drone according to claim 6, wherein each of the movable portions includes:
a transmission shaft guided to move in rotation inside the spar, the transmission shaft having a first end driven in pivoting by one of the two second electric actuators and a second end secured to the airfoil element to transmit pivoting motion from the transmission shaft to the airfoil element; and
a transfer gearbox having three bevel gears for transmitting rotary motion generated by one of the at least two second electric actuators to the transmission shaft.

8. A drone according to claim 6, wherein the drone includes at least two flexible transmission members, each flexible transmission member including a first end driven in pivoting by one of the at least two second electric actuators and a second end secured with one of the airfoil elements to transmit pivoting movement from the flexible transmission member to the airfoil element.

9. A drone according to claim 1, wherein each of the free ends of the at least one movable portions includes an absorber system for absorbing at least part of the kinetic energy of the drone during landing.

10. A drone according to claim 1, wherein the at least three rotors are formed at least by a left front rotor, a right front rotor, a left rear rotor, and a right rear rotor, where "left", "right", "front", and "rear" are relative to the longitudinal travel direction of the drone, the carrier structure having a shape that is elongate along the longitudinal direction X, the axes of rotation of the front rotors and the axes of rotation of the rear rotors being spaced at a longitudinal spacing L that is greater than a transverse spacing T between the axes of rotation of the left and right rotors, and wherein the wing is connected to the carrier structure in a middle zone of the carrier structure in the longitudinal direction X.

11. A drone according to claim 10, wherein the rotors have the same diameter $Ød$, and wherein the longitudinal spacing L between the axes of rotation of the front rotors and the axes of rotation of the rear rotors is greater than the sum of the diameter $Ød$ of the rotors plus a chord C of the half-wing measured in the proximity of a connection zone where the half-wing connects with the carrier structure.

12. A drone according to claim 1, wherein each of the movable portions includes at least one propulsion rotor driven in rotation by at least one electric propulsion motor, and wherein the control system is suitable for delivering an electrical power supply to the at least one electric propulsion motor.

* * * * *